US006498246B1

(12) United States Patent
Usuki et al.

(10) Patent No.: US 6,498,246 B1
(45) Date of Patent: Dec. 24, 2002

(54) GLYCOSAMINOGLYCAN DERIVATIVES AND PROCESSES FOR PREPARING SAME

(75) Inventors: Seigou Usuki, Tokyo (JP); Yutaka Kariya, Kanagawa (JP)

(73) Assignee: Seikagaku Corporation, Tokyo (JP)

( * ) Notice: Subject to any disclaimer, the term of this patent is extended or adjusted under 35 U.S.C. 154(b) by 0 days.

(21) Appl. No.: 09/623,132

(22) PCT Filed: Feb. 26, 1999

(86) PCT No.: PCT/JP99/00899

§ 371 (c)(1), (2), (4) Date: Aug. 28, 2000

(87) PCT Pub. No.: WO99/43714

PCT Pub. Date: Sep. 2, 1999

(30) Foreign Application Priority Data

Feb. 26, 1998 (JP) .......................................... 10-060336

(51) Int. Cl.⁷ .............................. C07H 5/04; C07H 5/06
(52) U.S. Cl. ...................... 536/55.2; 536/1.1; 536/4.1; 536/21; 536/55; 536/55.1; 536/55.3; 536/123.1; 536/124; 536/127
(58) Field of Search ............................... 514/23, 54, 56, 514/62; 536/1.11, 123.1, 124, 127, 4.1, 21, 55, 55.1, 55.2, 55.3

(56) References Cited

U.S. PATENT DOCUMENTS 5,280,016 A * 1/1994 Conrad et al. ................ 514/56

OTHER PUBLICATIONS

Fransson et al. Carbohydrate Research, 80 (1980) 131–145.*

Fransson et al. FEBS Letters, 97 (1979) 119–123.*

* cited by examiner

*Primary Examiner*—James O. Wilson
*Assistant Examiner*—Patrick Lewis
(74) *Attorney, Agent, or Firm*—Oblon, Spivak, McClelland, Maier & Neustadt, P.C.

(57) ABSTRACT

The invention provides novel glycosaminoglycan derivatives having a repeating unit structure of two saccharides of hexosamine and hexuronic acid as a backbone structure, in which the bonds between 2- and 3-positions carbon atoms of hexuronic acid as its constituting monosaccharide are partially cleaved and a part or all of the 2-position hydroxyl groups of uncleaved hexuronic acid are not substituted with a sulfate group, which has low anticoagulation activity and excellent neurite outgrowth promotion accelerating activity and sialidase inhibition activity; a process for producing the glycosaminoglycan derivatives, comprising a cleavage treatment of the bond between the 2- and 3-position carbon atoms of hexuronic acid having no sulfate group at the 2-position of glycosaminoglycan, and a selective desulfation treatment of the 2-position sulfate group of hexuronic acid; and a pharmaceutical composition comprising the glycosaminoglycan derivative as an active ingredient.

9 Claims, 8 Drawing Sheets

STEP (i): OXIDATIVE CLEAVAGE REACTION

STEP (i): REDUCTION OF ALDEHYDE GROUPS

STEP (ii): DESULFATION TREATMENT

GLYCOSAMINOGLYCAN DERIVATIVES AND PROCESSES FOR PREPARING SAME

TECHNICAL FIELD

The present invention relates to novel glycosaminoglycan derivatives having a neurite outgrowth promoting activity and a sialidase inhibiting activity, a process for producing them, and a pharmaceutical composition containing the glycosaminoglycan derivative as an active ingredient.

BACKGROUND ART

Neuronal disease is generated by the growth-inhibition of neural cells, by the induction of neural cell necrosis caused by the inability of the cells to be maintained due to reduction of sugar supply or energy metabolism inhibition in the cells as a result of ischemia, or by the inhibition of neurotransmission due to degradation of neurotransmitter. Accordingly, the treatment of this disease has been made with the aim of maintaining growth of neural cells, preventing ischemia of neural cells, or maintaining energy metabolism in the neural cells. That is, it is considered that the fundamental measures for the neuronal disease are to administer neurotrophic factors as substances having a neural cell growth activity (e.g., nerve growth factor: NGF, brain-derived neurotrophic factor: BDNF, ciliary neurotrophic factor: CNTF, fibroblast growth factor: FGF etc.) from the outside or promote synthesis of the neurotrophic factors, to prevent ischemia of neural cells and reduction of energy metabolism in neural cells caused by excess production of sorbitol formed by the activity of aldose reductase, by applying an aldose reductase inhibitor, and to maintain transmission of neural cells by preventing degradation of acetylcholine through the administration of an acetylcholine esterase. However, there are problems, such as antigenicity due to purity of the substance to be administered, side effects caused by the inhibition of enzyme activity, toxicity of the substance per se to be administered, and the like.

Also, it is known that glycosaminoglycan has the activity to accelerate neurite outgrowth promotion(J. Cell Physiol., 135: 293–300 (1988)). Furthermore, it is known that heparin and derivatives thereof, periodate oxidation reduction heparin and per-sulfated heparin, have a neurite outgrowth promoting activity and are effective in treating traumatic, ischemic and toxic neuropathy (JP-A-6-157322), but substances having a sufficient activity to inhibit these diseases for applying to medicaments have not been obtained yet.

On the other hand, it is known that sialidase (neuraminidase) inhibitors, such as GS4104 (WO 96/26933), zanamivir (4-guanidino-Neu4Ac2en: WO 91/16320, WO 94/07885), and the like, are effective as antiviral agents, particularly as influenza treating agents.

Since heparin and derivatives thereof are biological substances, they have a low antigenicity, but their use and concentration in using as medicaments are considerably limited due to their high anticoagulation activity. Generally, when heparin is administered to the living body, bleeding activity due to the high anticoagulation activity becomes a serious problem. Accordingly, a new substance having a low anticoagulation activity and a reinforced neuropathy improving effect is expected.

DISCLOSURE OF THE INVENTION

In order to resolve these problems, the present inventors have conducted intensive studies with the aim of obtaining a substance having a low anticoagulation activity for blood and an excellent neuropathy improving effect, and found, as a result of the efforts, that glycosaminoglycan derivatives having a specified structure have a high neurite outgrowth promoting activity, namely a neuropathy improving activity, and have accomplished the present invention by confirming that the anticoagulation activity of this substance is more sharply reduced than heparin. That is, it was found that novel glycosaminoglycan derivatives having a repeating unit structure of two saccharides of hexosamine and hexuronic acid as the backbone structure, in which the bondage between the 2- and 3-position carbon atoms of hexuronic acid as its constituting monosaccharide is partially cleaved and at least a part of the uncleaved hexuronic acid has no sulfate group on its 2-position, has a low anticoagulation activity and an excellent neurite outgrowth promoting activity. A pharmaceutical composition having an excellent effect for improving neuropathy using these properties can be provided. Additionally, based on the fact that a sialidase activity is increased and ganglioside known to have a relation to the maintenance and acceleration of a neurotrophic factor activity on the cell membrane is reduced when cell death and involution of neurite occur, the present inventors have conducted further investigations and found that the novel glycosaminoglycan derivative has a strong sialidase inhibition activity to provide a sialidase inhibitor using this inhibition activity of the glycosaminoglycan derivatives.

The first embodiment of the present invention relates to novel glycosaminoglycan derivatives having the following properties (a), (b) and (c) and comprising at least one structure represented by general formula (1) described in (d) per molecule of a backbone structure formed by a repeating unit structure of hexosamine and hexuronic acid:

(a) mol % of 2-deoxy-2-sulfamino-4-O-(4-deoxy-2-O-sulfo-α-L-threo-hex-4-enopyranosyluronic acid)-6-O-sulfo-D-glucose (hereinafter also referred to as "ΔDiHS-tri(U,6,N)S") being from 0 to 10%, mol % of 2-deoxy-2-sulfamino-4-O-(4-deoxy-α-L-threo-hex-4-enopyranosyluronic acid)-6-O-sulfo-D-glucose (hereinafter also referred to as "ΔDiHS-di(6,N)S") being from 95 to 70%, and mol % of 2-deoxy-2-sulfamino-4-O-(4-deoxy-α-L-threo-hex-4-enopyranosyluronic acid)-D-glucose (hereinafter also referred to as "ΔDiHS-NS") being from 5 to 20%, in a disaccharide composition obtained by a disaccharide analysis through a combination of degradation by a glycosaminoglycan degradation enzyme with analysis by high performance liquid chromatography, (b) activated partial thromboplastin time (APTT) when measured by adding to standard blood plasma at a final concentration of 3 μg/ml being 50 seconds or less, (c) weight average molecular weight being from 9,000 to 13,000 Da (dalton), and (d) general formula (1):

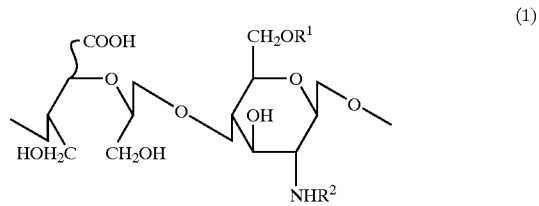

(wherein $R^1$ represents H or $SO_3H$; and $R^2$ represents $COCH_3$ or $SO_3H$).

The second embodiment of the present invention relates to a process for producing a novel glycosaminoglycan derivative having the properties (a), (b) and (c) and having the specified structure defined in (d), comprising the following steps (i) and (ii) described below; and the third embodiment of the present invention relates to a pharmaceutical composition comprising the glycosaminoglycan derivative as an active ingredient:

(i) a step in which a sulfated glycosaminoglycan having a repeating unit structure of hexosamine and hexuronic acid as a backbone structure is subjected to a cleavage treatment to cleave between only the 2- and 3-position carbon atoms of at least a part of hexuronic acid having no sulfate group on the 2-position in the backbone structure, and (ii) a step in which the product of the step (i) is subjected to a desulfation treatment by a desulfation method capable of specifically removing the 2-position sulfate group of hexuronic acid to desulfate 90% or more of sulfate groups of the total hexuronic acid having a sulfate group at the 2-position.

EMBODIMENTS FOR CARRYING OUT THE INVENTION

The present invention is described further in detail in the following.

Substance of the Invention

As described above, the substance of the present invention is a novel glycosaminoglycan derivative which has the properties (a), (b) and (c) and also has the specified structure defined in (d).

The term "hexosamine" as used herein means a monosaccharide in which the 2-position of hexose has an amino group, an acetylamino group or a sulfamino group and the 6-position hydroxyl group is optionally sulfated, the term "hexuronic acid" means a monosaccharide in which the 6-position carbon atom of hexose forms a carboxyl group and the 2-position hydroxyl group is optionally sulfated, the term "glycosaminoglycan" means a polysaccharide which has a structure formed by a repeating unit of hexosamine and hexuronic acid as the backbone structure, and the term "sulfated glycosaminoglycan" means a member of the glycosaminoglycan, which has hexosamine or hexuronic acid having a sulfate group as a constituting monosaccharide, and is a polysaccharide which has at least one hexuronic acid having no sulfate group at the 2-position as a constituting monosaccharide.

Also, the disaccharide composition (a) of the glycosaminoglycan derivative is calculated from values measured by a disaccharide analysis process which will be described later in Test Process 1 of Examples, and the weight average molecular weight (c) is a value measured by a molecular weight measuring process described in Test Process 2 of Examples. Also, the APTT of (b) is a value measured by an APTT measuring process described in Test Process 4 of Examples.

The disaccharide composition defined in (a) shows the ratio of each unsaturated disaccharide having a specified structure, which is calculated by defining the total amount of unsaturated disaccharides represented by the following general formula (7) as 100% (total mol % of 2-acetamido-2-deoxy-4-O-(4-deoxy-a-L-threo-hex-enopyranosyluronic acid)-D-glucose (hereinafter also referred to as "ΔDiHS-OS"), 2-acetamido-2-deoxy-4-O-(4-deoxy-α-L-threo-hex-4-enopyranosyluronic acid)-6-O-sulfo-D-glucose (hereinafter also referred to as "ΔDiHS-6S"), 2-deoxy-2-sulfamino-4-O-(4-deoxy-α-L-threo-hex-4-enopyranosyluronic acid) -D-glucose (ΔDiHS-NS), 2-acetamido-2-deoxy-4-O-(4-deoxy-2-O-sulfo-α-L-threo-hex-4-enopyranosyluronic acid) -D-glucose (hereinafter also referred to as "ΔDiHS-US"), 2-deoxy-2-sulfamino-4-O-(4-deoxy-α-L-threo-hex-4-enopyranosyluronic acid)-6-O-sulfo-D-glucose (hereinafter also referred to as "ΔDiHS-di(6,N)S"), 2-deoxy-2-sulfamino-4-O-(4-deoxy-2-O-sulfo-α-L-threo-hex-4-enopyranosyluronic acid)-D-glucose (hereinafter also referred to as "ΔDiHS-di(U,N)S"), 2-acetamido-2-deoxy-4-O-(4-deoxy-2-O-sulfo-α-L-threo-hex-4-enopyranosyluronic acid)-6-O-sulfo-D-glucose (hereinafter also referred to as "ΔDiHS-di(U,6)S") and 2-deoxy-2-sulfamino-4-O-(4-deoxy-2-O-sulfo-α-L-threo-hex-4-enopyranosyluronic acid) -6-O-sulfo-D-glucose (ΔDiHS-tri(U,6,N)S)) that can be identified by the disaccharide analysis described in Test Process 1 in which enzyme digestion and high performance liquid chromatography are used in combination, and the value reflects the position and number of sulfate groups of the glycosaminoglycan derivative before the enzyme digestion.

TABLE 1

(7)

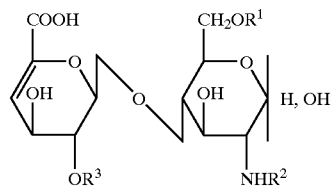

| Unsaturated disaccharide | Substituents of the formula | | |
|---|---|---|---|
| | $R^1$ | $R^2$ | $R^3$ |
| ΔDiHS-OS | H | COCH$_3$ | H |
| ΔDiHS-6S | SO$_3$H | COCH$_3$ | H |
| ΔDiHS-NS | H | SO$_3$H | H |
| ΔDiHS-US | H | COCH$_3$ | SO$_3$H |
| ΔDiHS-di(6,N)S | SO$_3$H | SO$_3$H | H |
| ΔDiHS-di(U,N)S | H | SO$_3$H | SO$_3$H |
| ΔDiHS-di(U,6)S | SO$_3$H | COCH$_3$ | SO$_3$H |
| ΔDiHS-tri(U,6,N)S | SO$_3$H | SO$_3$H | SO$_3$H |

Also, the structures represented by the above abbreviations may also be shown as follows:
ΔDiHS-OS: ΔHexA1→4GlcNAc, ΔDiHS-6S: ΔHexA1→4GlcNAc(6S), ΔDiHS-NS: ΔHexA1→4GlcNS, ΔDiHS-US: ΔHexA(2S)1→4GlcNAc, ΔDiHS-di(6,N)S: ΔHexA1→4GlcNS(6S), ΔDiHS-di(U,N)S: ΔHexA(2S)1→4GlcNS, ΔDiHS-di(U,6)S; ΔHexA(2S)1→4GlcNAc(6S), and ΔDiHS-tri (U,6,N)S: ΔHexA(2S)1→4GlcNS(6S).

In the above formulae, ΔHexA means unsaturated hexuronic acid, GlcNAc means N-acetylglucosamine, GlcNS means N-sulfated glucosamine and the parenthesized part shows binding position of sulfate group.

The unsaturated disaccharide having the structure of general formula (7) formed in the disaccharide analysis process is formed from a backbone structure of (A)-(B) in general formula (2) in which the hexuronic acid of general formula (3) or (4) and the hexosamine of general formula (6), which constitute the backbone structure of glycosaminoglycan to be analyzed, are bonded to each other.

The glycosaminoglycan derivatives of the present invention are novel polysaccharides having specified physical properties derived from glycosaminoglycan, but are described herein as glycosaminoglycan derivatives for the sake of convenience.

The glycosaminoglycan derivatives of the present invention are sulfated polysaccharides in which, in the disaccharide composition calculated from the values measured by the disaccharide analysis process described in Test Process 1, mol % of ΔDiHS-tri(U,6,N)S is from 0 to 10%, preferably from 0 to 5%, and more preferably from 2 to 4%, mol % of ΔDiHS-di(6,N)S is from 95 to 70%, preferably from 90 to 80%, and more preferably from 82 to 87%, mol % of ΔDiHS-NS is from 5 to 20%, preferably from 10 to 15%, and more preferably from 11 to 14%, and its weight average molecular weight as a value measured by the molecular weight measuring process described in Test Process 2 is from 9,000 to 13,000 Da, and more preferably from 10,000 to 12,000 Da.

Also, the glycosaminoglycan derivatives of the present invention are glycosaminoglycan derivatives which have a structure formed by the repeating unit of hexosamine and hexuronic acid as the backbone structure. Examples of the hexosamine include glucosamine, galactosamine and mannosamine, and glucosamine is preferred. It is preferred that one or both of the amino group and the 6-position hydroxyl group of hexosamine are sulfated, namely, it is N-sulfated and/or 6-O-sulfated, though there is no hindrance when the hexosamine has no sulfate group. Examples of the hexuronic acid include D-glucuronic acid, L-iduronic acid and the like. It is preferred that a part of hexuronic acid is cleaved between the 2- and 3-position carbon atoms, preferably, the cleaved region is reduced after oxidative cleavage reaction, and that a part or entire portion of the 2-position hydroxyl group of uncleaved hexuronic acid is not substituted with a sulfate group. In addition, one or more of the structural unit represented by general formula (1) in which the cleaved hexuronic acid is bonded to hexosamine in the repeating unit of the backbone structure is present in one molecule of the glycosaminoglycan derivative.

Also, the glycosaminoglycan derivatives of the present invention have a characteristic in that activated partial thromboplastin time (APTT) when measured by adding it to standard blood plasma at a final concentration of 3 μg/ml is 50 seconds or less. The glycosaminoglycan derivatives of the present invention having such a characteristic can be represented by the following general formula (2):

HO—((A)-(B))$_n$—H     (2)

In this formula, (A) represents a glucuronic acid residue represented by the following general formula (3), an iduronic acid residue represented by the following general formula (4), or a cleaved hexuronic acid residue represented by the following general formula (5):

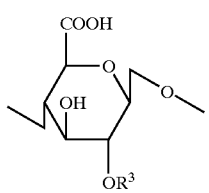

(3)

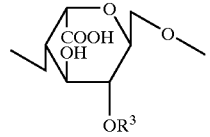

(4)

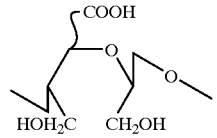

(5)

and (B) represents a hexosamine derivative residue represented by the following general formula (6):

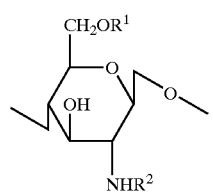

(6)

In general formulae (3) to (6), $R^1$ and $R^3$ each independently represents H or $SO_3H$, and $R^2$ independently represents $COCH_3$ or $SO_3H$.

Also, a hexosamine residue represented by general formula (6) in which at least one of $R^1$ and $R^2$ is $SO_3H$ is present in-molecule of the glycosaminoglycan derivative of the present invention represented by general formula (2).

In addition, in general formula (2), n is an integer which satisfies $15 \leq n \leq 40$, preferably $20 \leq n \leq 30$, and at least one of (A) is a residue of general formula (5).

The glycosaminoglycan derivatives of the present invention (hereinafter referred also to as "inventive substances") are not particularly limited, so long as they are derivatives of a sugar chain using hexosamine and hexuronic acid as the backbone structure and have a sulfate group, and so long as they satisfy the characteristics of (a) to (d). However, derivatives of heparan sulfate or heparin, particularly derivatives of heparin, are preferred. The inventive substances have a structure in which a part of hexuronic acid is cleaved between the 2- and 3-position carbon atoms. Also, the sulfation ratio of the 2-position hydroxyl group of uncleaved hexuronic acid as a constituent of the inventive substances is less than 10%, preferably less than 5%. The glycosaminoglycan derivatives of the present invention can be represented by general formula (2), wherein n is $15 \leq n \leq 40$, preferably $20 \leq n \leq 30$, namely, they are polysaccharides having from 30 to 80 sugar residues, preferably from 40 to 60 sugar residues. In addition, since the anticoagulation activity of the substances is low, it is preferred that the activated partial thromboplastin time (APTT) when measured by adding them to a standard blood plasma sample collected from a healthy parson at a final concentration of 3 μg/ml is 50 seconds or less.

In the neurite outgrowth promoting activity test described in Examples in which primary culture cells of Wistar rat cerebral cortex cells are used, it is preferred that the glycosaminoglycan derivatives as the inventive substances have 1.5 times or higher activity than the case of standard heparin when culturing is carried out by adding the substances at a final concentration of from 1 μg/ml to 10 μg/ml.

In addition, it is preferred that the inventive substances show markedly stronger sialidase inhibition activity, particularly influenza virus sialidase inhibition activity, than known sialidase inhibitors and standard heparin, when measured by the process described in Examples.

Production Process of the Invention

The production process of the present invention is a process for producing glycosaminoglycan derivatives having a repeating unit structure of hexosamine and hexuronic acid as the backbone structure, in which a part of hexuronic acid is cleaved between the 2- and 3-position carbon atoms, preferably, the cleaved region is reduced after cleavage by an oxidative cleavage reaction, and the greater part of the 2-position sulfate group of uncleaved hexuronic acid is desulfated, which comprises the following steps (i) and (ii):

(i) a step in which a glycosaminoglycan having a repeating unit structure of hexosamine and hexuronic acid as the backbone structure is subjected to a cleavage treatment to cleave between only the 2- and 3-position carbon atoms of at least a part of hexuronic acid having no sulfate group on the 2-position, and (ii) a step in which the product of step (i) is subjected to a desulfation treatment by a desulfation method capable of specifically removing the 2-position sulfate group of hexuronic acid to desulfate 90% or more of sulfate groups of the hexuronic acid having a sulfate group at the 2-position.

1. Sulfated Glycosaminoglycan (Material)

The glycosaminoglycan used in the process of the present invention is a polysaccharide having a repeating unit structure of hexosamine and hexuronic acid as the backbone structure and containing at least one hexuronic acid having no sulfate group at the 2-position as a constituting monosaccharide. Preferred examples of the glycosaminoglycan include heparin, heparan sulfate, and the like, and heparin is particularly preferred, because the sulfation ratio of the 2-position hydroxyl group of hexuronic acid is high and the cleavage of hexuronic acid in the following step (i) can be appropriately controlled.

2. Step (i): Cleavage Treatment of Hexuronic Acid

The "cleavage treatment" described in the step (i) of the process of the present invention is not particularly limited, so long as it is a treatment for specifically cleaving only between the 2- and 3-position carbon atoms of hexuronic acid having no sulfate group at the 2-position among constituting monosaccharides of sulfated glycosaminoglycan. Examples thereof include an oxidation-reduction treatment. This oxidation-reduction treatment is carried out by cleaving between the 2- and 3-position carbon atoms of the specified hexuronic acid through an oxidation reaction using an oxidizing agent to obtain an oxidatively cleaved reaction product and then reducing the aldehyde groups formed in the cleaved region of the hexuronic acid through a reduction reaction treatment. The oxidizing agent is not particularly limited, so long as it is a substance which can achieve the object of this reaction. Examples thereof include a periodate, hydrogen peroxide, and a periodate is particularly preferred. Examples of the periodate include periodic acid alkali metal salts, such as sodium periodate, potassium periodate and the like, and sodium periodate is preferred.

When an oxidation-reduction reaction treatment is carried out as the cleaving treatment, an oxidation reaction is carried out, for example, in a solution containing sodium periodate at a concentration of from 0.01 to 0.3 M preferably from 0.05 to 0.2 M, and the sulfated glycosaminoglycan at a concentration of from 0.5 to 10%, preferably from 1 to 7%, at a pH of from 3 to 7, preferably from 4 to 5, and at a treating temperature of from 0 to 37° C., preferably from 0 to 10° C., more preferably 4° C., for at least 1 day, preferably 3 days. After the oxidation reaction, excess sodium periodate is decomposed through a reducing reaction by adding from 100 to 500 mM ethylene glycol or glycerol. Thereafter, an oxidative cleavage reaction product of hexuronic acid can be obtained by carrying out dialysis or further employing freeze-drying or ethanol precipitation process as occasion demands.

Thereafter, the oxidation-reduction reaction treatment of hexuronic acid is completed by further reducing the aldehyde groups formed in the cleaved region of hexuronic acid by periodic acid oxidation. The reduction of aldehyde groups can be carried out using a reducing agent such as an alkali metal borohydride or lithium aluminum hydride, and the reducing agent is preferably an alkali metal borohydride, most preferably sodium borohydride. When sodium borohydride is used as the reducing agent, it is preferred to carry out the reaction, for example, in a solution of pH 8.5 to 9.5 containing from 0.1 to 0.5 M, preferably 0.2 M, of sodium borohydride and from 1 to 20%, preferably from 5 to 10% of the oxidative cleavage reaction product (w/v), at 4° C. for 3 hours. It is preferred to obtain a sodium salt of the periodic acid oxidation-reduction reaction product by further decomposing excess sodium borohydride by adjusting the reaction solution to pH 4 to 5 and then terminating the reduction reaction by dialyzing it against distilled water.

Particularly, when heparin is used as the material, it is preferred to carry out the cleavage treatment by an oxidation-reduction reaction treatment using a periodate and an alkali metal borohydride, and a periodic acid oxidation-reduction heparin is obtained by this treatment as a periodic acid oxidation reduction product of heparin.

The hexuronic acid cleavage product of sulfated glycosaminoglycan obtained by the treatment to specifically cleave hexuronic acid among the constituting monosaccharides of sulfated glycosaminoglycan is subjected to the subsequent step (ii) in which the 2-position sulfate group of at least a part of hexuronic acid is desulfated.

3. Step (ii): Desulfation Treatment

The "desulfation treatment" described in the step (ii) of the process of the present invention can be carried out without particular limitation, so long as it is a treatment (selective desulfation treatment) to selectively desulfate the 2-position sulfate group of the hexuronic acid having a sulfate group at the 2-position, which constitutes the "hexuronic acid cleavage product of sulfated glycosaminoglycan" formed in the step (i). When complete desulfation is desired, it is preferred to employ a process which is carried out under alkaline conditions, namely a process by hydrolysis reaction, particularly a process which includes a step in which the hexuronic acid cleavage product of sulfated glycosaminoglycan obtained in the step (i) is dissolved in an aqueous solution of an alkali metal hydroxide, such as sodium hydroxide, potassium hydroxide, or the like, or an aqueous solution of an alkaline earth metal hydroxide, such as magnesium hydroxide, calcium hydroxide, or the like, preferably an aqueous alkali metal hydroxide solution, most preferably an aqueous sodium hydroxide solution, and the resulting solution is immediately frozen to carry out freeze-drying.

Specifically, a solution of the hexuronic acid cleavage product of glycosaminoglycan is prepared by dissolving the hexuronic acid cleavage product of glycosaminoglycan in an aqueous alkali metal hydroxide solution or aqueous alkaline earth metal solution having a concentration of from 0.0125 to 0.2 N, preferably at ice-cooling (0° C.) to room temperature (24° C.), and then the resulting solution is freeze-dried.

Thereafter, it is preferred that the freeze-dried product is again dissolved in an aqueous alkali metal hydroxide solution or aqueous alkaline earth metal solution (0.0125 to 0.2 N) to a concentration of from 1 to 2.5 M, preferably 2 M, and the resulting solution is adjusted to pH 8 to 10 with an acid, preferably a weak acid, more preferably a carboxylic acid, such as acetic acid or the like, and immediately subjected to dialysis against distilled water for at least 1 day, preferably 2 days, followed by freeze-drying or ethanol precipitation.

Desulfation of the hexuronic acid cleavage product of sulfated glycosaminoglycan is carried out in such a manner that generally 70% or more, preferably 90% or more, more preferably 95% or more, of the 2-position sulfate groups of uncleaved hexuronic acid are removed.

According to the process of the present invention, when the partial desulfation treatment is carried out using the periodic acid oxidation-reduction heparin obtained in the step (i) from heparin as the material sulfated glycosaminoglycan, the partially 2-O-desulfated periodic acid oxidation-reduction heparin of the present invention is obtained.

A schematic illustration of the reaction steps for the production of the glycosaminoglycan derivative of the present invention from heparin as the starting material by the cleavage treatment of step (i) and the desulfation treatment of step (ii) is shown in FIG. 1. In the drawing, (a) is a schematic representation of heparin, (b) is a reaction product in which aldehyde groups are formed by the oxidative cleavage reaction of hexuronic acid, (c) is a reduction reaction treated product obtained by the reduction reaction treatment of the aldehyde groups of (b), and (d) is a glycosaminoglycan derivative of the present invention in which the 2-O-sulfate group is selectively desulfated.

Composition 1 of the Invention

Composition 1 of the present invention is a therapeutic agent for neurological disorders, comprising, as an active ingredient, the inventive substance, a glycosaminoglycan derivative or a pharmaceutically acceptable salt thereof.

The glycosaminoglycan derivatives having neurite outgrowth promoting activity are useful as a pharmaceutical composition using the activity, such as a neuronal disease treating agent for, for example, central nerve diseases (e.g., Alzheimer disease, ischemic dementia, etc.) or peripheral nerve diseases (e.g., diabetic neuropathy, alcoholic neuropathy, amyotrophic lateral sclerosis (ALS), peripheral nerve damage caused by injury or side effect of medicament, Guillain-Barre syndrome, etc.).

Also, the glycosaminoglycan derivatives of the present invention which are the active ingredient of Composition 1 of the present invention can also be applied to therapeutic and preventing agents as a nervous function reduction inhibitor, because they can prevent reduction of nervous functions accompanied by nerve degeneration, by inhibiting the activity of sialidase to degrade cell membrane ganglioside which is concerned in the maintenance of neural cell survival, synaptic function and axon function.

Composition 2 of the Invention

Composition 2 of the present invention is a sialidase inhibitor, comprising, as an active ingredient, the inventive substance, a glycosaminoglycan derivative or a pharmaceutically acceptable salt thereof.

The glycosaminoglycan derivatives having sialidase inhibition activity as the inventive substances can be used as a sialidase inhibitor using its activity. Particularly, since they can inhibit growth of viruses by inhibiting viral sialidase, they can be used as an anti-viral agent, particularly as an anti-influenza remedy. Particularly, the inventive substances show markedly more excellent sialidase inhibition activity than known sialic acid derivatives used as influenza remedies.

The term "remedy" as used herein includes not only drugs for improving conditions of patients into normal states and drugs for alleviating diseases but also a concept of "drugs for prevention" for preventing infection with and contraction of diseases.

Examples of the pharmaceutically acceptable salts of the glycosaminoglycan derivatives, which are used as the active ingredient of Compositions 1 and 2 of the present invention include pharmaceutically acceptable salts among amine salts, quaternary ammonium salts, alkali metal salts and alkaline earth metal salts. Specific examples include sodium salts, potassium salts, calcium salts, magnesium salts, and the like, and sodium salts and potassium salts as alkali metal salts are preferred, and sodium salts are more preferred, for example, in view of the affinity for the living body.

The glycosaminoglycan derivatives of the present invention show a characteristic of being lower in anticoagulation activity than standard heparin. In especially desirable glycosaminoglycan derivatives, it is most preferred that the APTT value becomes 50 seconds or less when measured in accordance with the process shown in Test Example 4 which will be described later, by setting the concentration in the measuring solution (final concentration) to 3 $\mu$g/ml. Also, regarding the glycosaminoglycan derivative (the inventive substance) used in the composition of the present invention as a pharmaceutical composition, it is preferred that at least one of thrombin time (hereinafter referred to as "TT") calculated by a TT measuring process which will be described later and APTT activity calculated by the APTT measuring process becomes 5% or less in comparison with standard heparin. Still more preferably useful is a substance having a relatively low TT activity, in which the TT activity and the APTT activity are both 3% or less in comparison with standard heparin and both of these activities have a relationship of $0 \leq$ TT activity/APTT activity $\leq 0.5$, because low bleeding activity can be expected when used in a pharmaceutical composition.

The term "standard heparin" as used herein means a substance identical to the standard heparin described in Examples.

When a pharmaceutical composition containing the inventive substance as the active ingredient is administered to the living body, the dosage form and route of administration can be optionally selected in response to the properties and seriousness of the disease to be treated. For example, it can be safely administered parenterally or orally to a warm-blooded animal (e.g., human, mouse, rat, hamster, rabbit, dog, cat, horse, etc.) as it is or as pharmaceutical composition preparations together with other pharmaceutically acceptable additives, such as carriers, fillers, diluents and the like (e.g., injections, suppositories, tablets, capsules, solutions, ointments, gels, etc.).

Regarding the administration form of the therapeutic agent for neuronal diseases, parenteral administration is preferred, injections can be cited as the dosage form suitable for the administration form, and intravenous injection or drip infusion can be exemplified as preferred mode of the administration process, though not limited thereto.

Regarding the administration form of the influenza remedy, any of its oral and parenteral administration forms can be optionally selected. Examples of the dosage form suitable for oral administration include powders, granules, tablets, capsules, aerosols and sprays, and solutions can be exemplified as the dosage form suitable for parenteral administration. In addition, as the dosage form of the influenza remedy particularly for prevention, solutions used by oral administration are also preferred, and administration of the solutions using a spray or the like can be cited as a preferred process, though not limited thereto.

A formulating amount and a dose of the glycosaminoglycan derivative as the active ingredient of the preparation are not particularly limited, because they should be decided individually depending on, for example, the administration process, administration form and using purpose of the preparation and illustrative symptoms and body weight of each patient, but in the case of intravenous injection, approximately from 100 µg/kg to 100 mg/kg per day can be exemplified as the amount of the glycosaminoglycan derivatives to be administered to a patient. Also, regarding the administration frequency of the preparation, once a day is possible, and it can also be administered by dividing the daily dose into 2 to 4 or more doses per day. It is also possible to administer it continuously by, for example, drip infusion.

In this connection, the glycosaminoglycan derivative as the active ingredient of the pharmaceutical composition showed no toxicity upon cells in the following Examples. It is known that the $LD_{50}$ value of heparin by an acute toxicity test in mice (males and females) is 5,000 mg/kg or more by oral administration, 2,500 mg/kg or more by subcutaneous or intraperitoneal administration and about 1,000 mg/kg by intravenous injection. Since the glycosaminoglycan derivatives as the active ingredient of the pharmaceutical composition of the present invention show markedly low APTT activity and TT activity of both less than 3% in comparison with the standard heparin, this fact also supports high safety of the glycosaminoglycan derivatives (the inventive substances) which are the active ingredient of the pharmaceutical composition.

BEST MODE FOR CARRYING OUT THE INVENTION

Figure 1:
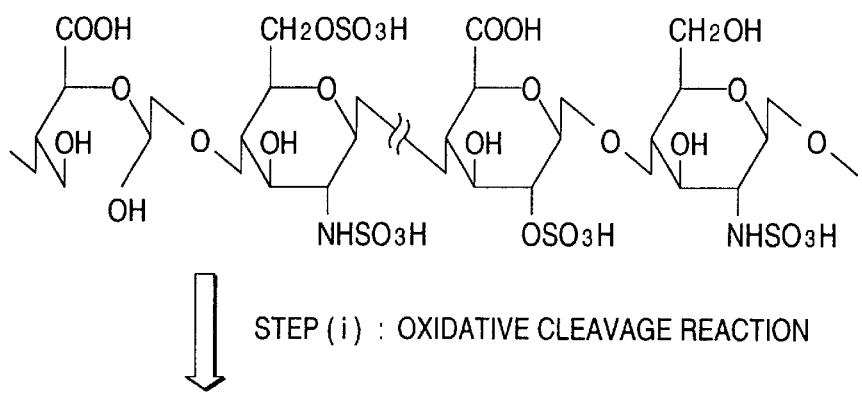
FIG. 1 is a schematic view showing an example of the production steps of the glycosaminoglycan derivatives of the present invention.
Figure 1:
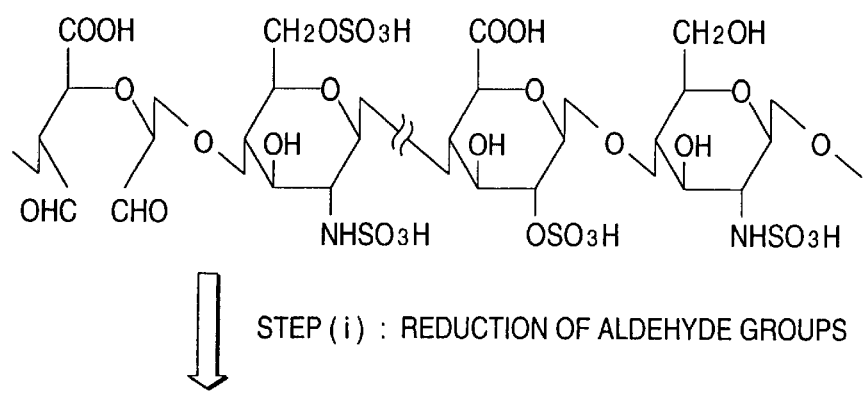
Figure 1:
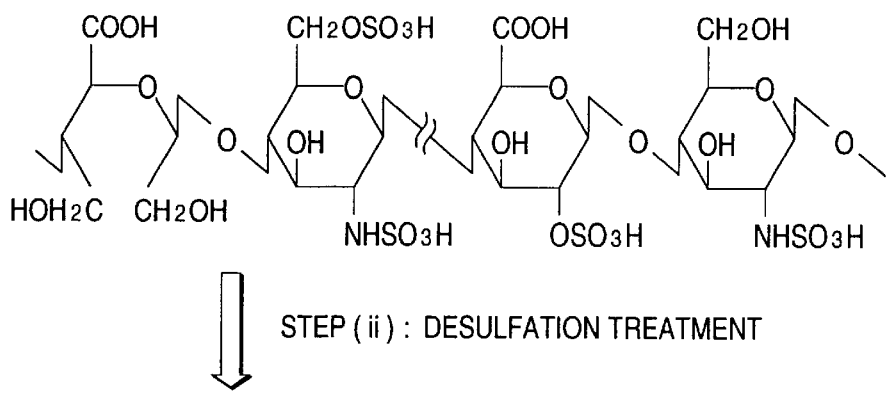
Figure 1:
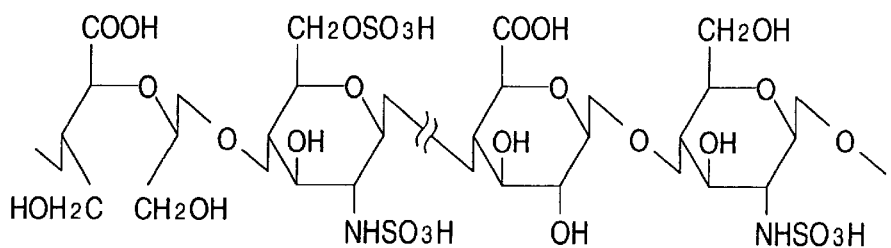

The present invention is described more illustratively with reference to examples, but the present invention is not limited to the following examples unless overstepping its gist.

In this case, test processes in the examples are as follows.

Test Process 1

Disaccharide Analysis by Enzyme Digestion

Analysis of the position of sulfate group on the inventive substance and standard heparin was carried out in the following manner. That is, each glycosaminoglycan was subjected to enzyme digestion, and the thus formed unsaturated disaccharides (general formula (7)) were analyzed by high performance liquid chromatography (HPLC) (cf., "2·8 Structural analysis by a combination of glycosaminoglycan hydrolyzing enzymes with HPLC" described at page 49–62 in *New Biochemical Experiment Course* 3, *Saccharide II* (published by Tokyo Kagaku Dojin, 1991)). By calculating a peak area of each unsaturated disaccharide, each peak area based on the total area was expressed by percentage.

(1) Digestion of the Standard Heparin and the Inventive Substance with Degrading Enzymes They were digested with degrading enzymes by the process described in *New Biochemical Experiment Course* 3, *Saccharide II*, pages 53–59. In 220 µl of 20 mM sodium acetate (pH 7.0) containing 2 mM calcium acetate, 1.0 mg of each of the standard heparin and the inventive substance was dissolved and 20 mU of heparitinase, 20 mU of heparitinase I and II, were added to the solution to carry out the reaction at 37° C. for 2 hours.

(2) Analysis by HPLC

Using an HPLC (Model 852, Irika), 50 µl of the solution after enzyme digestion of the standard heparin or the inventive substance was analyzed. An ion exchange column (CarboPac PA-1 column, 4.0 mm×250 mm, manufactured by Dionex) was used, and absorbance at 232 nm was measured. Unsaturated Disaccharide Standard (manufactured by Seikagaku Corporation) was used as the standard (Yamada et al., *J. Biol. Chem.*, 270, 8696–8706 (1995)), and the analysis was carried out at a flow rate of 1 ml/min in accordance with a process in which a lithium chloride gradient system (50 mM→2.5 M) is used (Kariya et al., *Comp. Biochem. Physiol.*, 103B, 473 (1992)).

Test Process 2

Molecular Weight Measurement

By a gel filtration using HPLC, 5 µl of 1% solution of the standard heparin or the inventive substance was analyzed. TSK-gel-(G4000+G3000+G2500) PWX (7.8 mm×30 cm, manufactured by Tosoh) was used as the column, and development was carried out with 0.2 N sodium chloride at 40° C. and at a flow rate of 0.6 ml/min. A differential refractometer (AID-2A, manufactured by Shimadzu) was used for the detection. The weight average molecular weight shown in Table 1 was calculated using a standard molecular weight preparation of heparin as the control (Kaneda et al., *Biochem. Biophys. Res. Comm.*, 220, 108–112 (1996)).

Test Process 3

Measurement of Neurite Outgrowth Promoting Activity

A fetus was aseptically excised from a Wistar rat in the 17th day of pregnancy (purchased from Japan SLC). The brain was excised from the fetus, and the cerebral cortex was obtained by removing the cerebellum, mid-brain, inter-brain and meninges in an un-sulfated DMEM medium (prepared by dissolving 500 mg of anhydrous $CaCl_2$, 0.25 mg of $Fe(NO)_3/9H_2O$, 1,000 mg of KCl, 193.3 mg of $MgCl_2$, 9,250 mg of $NaHCO_3$, 312.5 mg of $NaH_2PO_4/H_2O$, 37.5 mg of Phenol Red, 275 mg of sodium pyruvate, 100 ml of MEM amino acid (No. 11130–051, manufactured by Gibco), 75 mg of L-glycine, 1,460 mg of L-glutamine, 105 mg of L-serine, 100 ml of MEM vitamin solution (No. 11120-052, manufactured by Gibco), 15,150 mg of NaCl and 11,250 mg of D-glucose in 2.5 L of sterilized distilled water and adjusting the solution to pH 7.2).

Cerebral cortexes obtained from 10 animals were finely sliced 100 times in both lengthwise and crosswise with a safety razor on a 60 mm dish, and the cerebral cortex slices were mixed twice with 10 ml of phosphate-buffered saline (PBS) and dispensed into a 50 ml capacity Falcon tube to which was subsequently added 11 ml of the un-sulfated DMEM medium. While uniformly suspending by gentle shaking, this was dispensed in 0.5 ml portions into wells of a 24 well plate (bottom area, 2 $cm^2$) which had been coated with 0.1% polyethylene imine. After 2 hours of the commencement of culturing, 100 μl of each sample was taken out, and 50 μl of PBS containing each substance to be tested having 10 time concentration of its final concentration and 50 μl of 400 μM chloric acid/un-sulfated DMEM medium were added. After 2 days of culturing at 37° C. under 5% $CO_2$, 500 μl of 1% glutaraldehyde/PBS was gently over-layered to carry out 20 minutes of fixation at room temperature. After removing the supernatant by suction, 0.5 ml of PBS was slowly over-layered and then immediately removed by suction. A 20% Giemsa solution/potassium phosphate buffer was over-layered and allowed to stand for 2 hours at room temperature. After removing the supernatant by suction, 0.5 ml of PBS was added. Under a light microscope of 40×magnification, those which showed neurite outgrowth promotion among 100 cerebral cortex cell masses having a size of from 50 to 200 μm and existing in the entire visual field were counted and their ratio (%) was calculated.

Test Process 4

Measurement of APTT and TT

For the measurement of APTT, blood was collected from rat lower aorta by 3.2% citric acid 1/10 volume and centrifuged at 1,000×g for 10 minutes, and 100 μl of the thus obtained blood plasma and 100 μl of each sample having varied concentration were put into a measuring cup and incubated at 37° C. for 1 minute. Thereafter, 100 μl of Actin (trade name, Yoshitomi Pharmaceutical) which had been incubated in advance at 37° C. was added thereto, and the incubation was continued for 2 minutes. Next, 100 μl of 0.02 M $CaCl_2$ solution which had been incubated in advance at 37° C. was added thereto, and the period of time from this point until generation of coagulation was measured using a blood coagulation automatic measuring apparatus (KC-10A: manufactured by Amelung). Also, in Table 2, the final concentration of each of the inventive substance and standard heparin in the medium, by which the APTT value becomes 100 seconds, was obtained to calculate the concentration of the standard heparin as percentage based on the concentration of the inventive substance, and this value (%) was used as the APTT activity of the inventive substance.

For the measurement of TT, 100 μl of the blood plasma and 100 μl of each sample having varied concentration were put into a measuring cup and incubated at 37° C. for 1 minute. Thereafter, 100 μl of thrombin (10 U/ml) incubated in advance at 37° C. was added thereto, and the period of time from this point until generation of coagulation was measured using the blood coagulation automatic measuring apparatus. In Table 2, the final concentration of each of the inventive substance and standard heparin in the medium, by which the TT value becomes 100 seconds, was obtained to calculate the concentration of the standard heparin as percentage based on the concentration of the inventive substance, and this value (%) was used as the TT activity of the inventive substance.

Standard Heparin in This Description

A heparin preparation having the following physical properties was used as the standard heparin.

(1) As shown in Table 3, the disaccharide composition of the standard heparin calculated from values measured by the disaccharide analysis process described in Test Process 1 was ΔDiHS-OS: 4.1%, ΔDiHS-NS: 3.4%, ΔDiHS-6S: 3.7%, ΔDiHS-US: 2.6%, ΔDiHS-di(6,N)S: 12.7%, ΔDiHS-di(U,N)S: 7.6%, ΔDiHS-di(U,6)S; 1.7% and ΔDiHS-tri(U,6,N)S: 64.2%, and this result shows that sulfate group is not present on the 2-position of the 23.9% uronic acid (all of the % values indicate mol % ratios).

(2) Its anticoagulation activity is 160 IU/mg.

(3) Its weight average molecular weight is from 11,000 to 14,000 Da.

EXAMPLE 1

Production Example

1. Partial Cleavage Treatment of Hexuronic Acid by Periodic Acid Oxidation-Reduction of Standard Heparin In the presence of sodium periodate, 1.3 g of a heparin sodium salt (weight average molecular weight: 13,700 Da, Lot No. 4021 manufactured by Syntex: standard heparin) was oxidized. That is, this oxidation reaction was carried out in a solution of pH 5 containing 50 ml of 0.05 N sodium periodate and 50 mM of sodium acetate by oxidation-treating heparin sodium salt at 4° C. for 3 days. After the oxidation treatment, excess periodic acid was reduction-decomposed by adding glycerol to a final concentration of 250 mM, and the resulting solution was dialyzed against distilled water for 2 days and then freeze-dried to obtain 1.2 g of periodic acid oxidized heparin. Regarding the aldehyde groups generated by the formation of periodic acid oxidized heparin, 1.2 g of the oxidized heparin was dissolved in 30 ml of 0.2 N sodium borohydride solution, pH 9, containing 0.25 N sodium bicarbonate and subjected to 3 hours of the reaction at 4° C., thereby reducing aldehyde groups of the periodic acid oxidized heparin. Excess sodium borohydride was decomposed by adjusting the reaction solution to pH 5 with glacial acetic acid and allowing the solution to stand at room temperature for 30 minutes, and the resulting solution was again adjusted to pH 9 with 5 N sodium hydroxide, dialyzed against distilled water for 2 days and then freeze-dried to obtain 1.1 g of a sodium salt of periodic acid oxidation-reduction heparin.

2. Partial 2-O-Desulfation of Periodic Acid Oxidation-Reduction Heparin

In 20 ml of 0.05 N sodium hydroxide aqueous solution, 1.1 g of the periodic acid oxidation-reduction heparin sodium salt obtained in the step 1 was dissolved, and the solution was allowed to stand at room temperature for 20 minutes. This solution was freeze-dried to selectively desulfate the 2-position sulfate group, and the freeze-dried powder was dissolved in 10 ml of 1 N aqueous sodium hydroxide solution, adjusted to pH 9 with 20% acetic acid solution and then allowed to stand at room temperature for 30 minutes. Thereafter, this mixture was dialyzed against distilled water for 2 days and again freeze-dried to obtain 0.8 g of a sodium salt of desulfated periodic acid oxidation-reduction heparin (selectively 2-O-desulfated periodic acid oxidation-reduction heparin).

Figure 2:
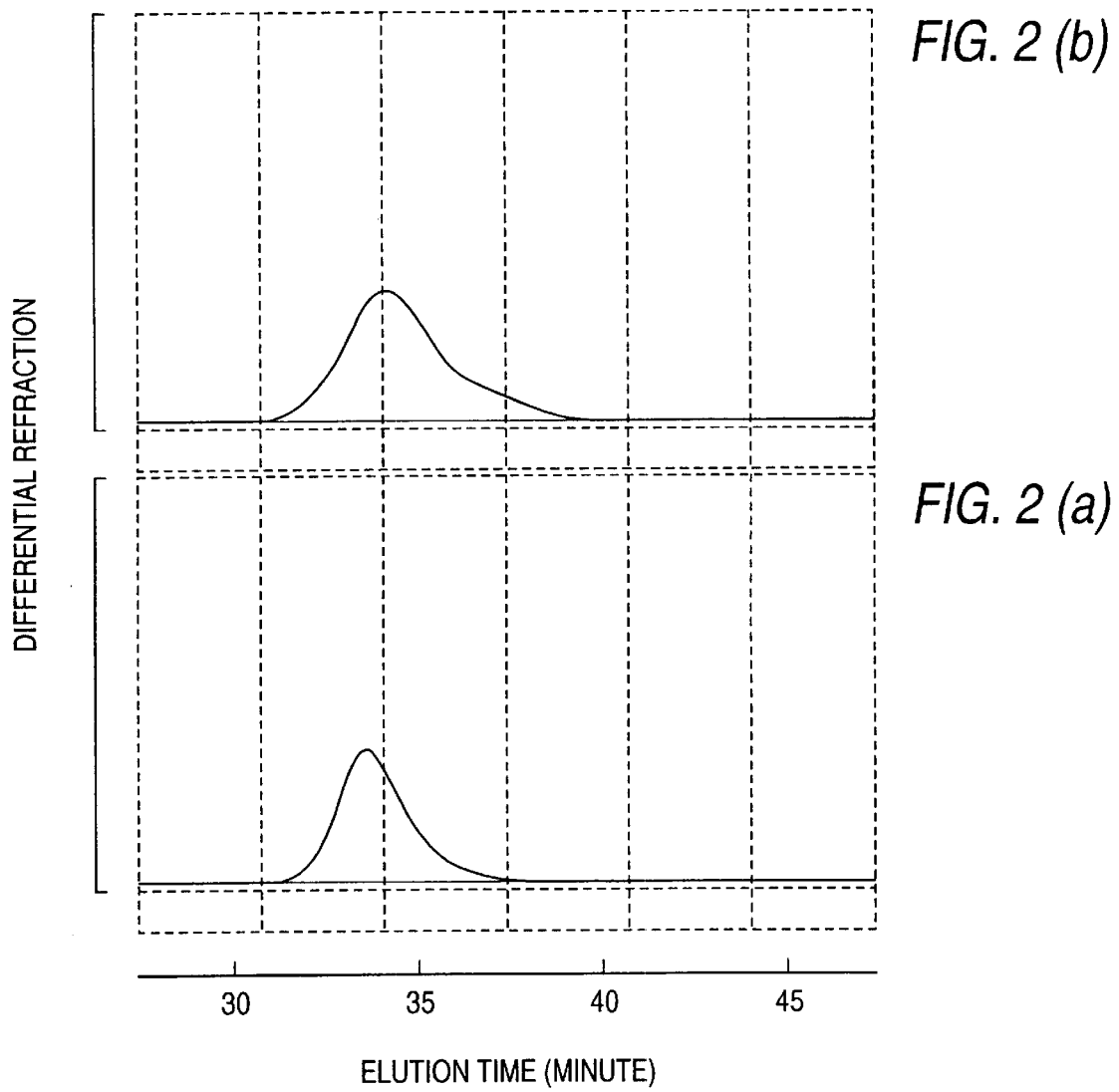
FIG. 2 is an elution chart graph of the standard heparin (a) and the inventive substance (b) by HPLC.

A weight average molecular weight of the inventive substance was measured by HPLC in accordance with Test Process, and the results are shown in FIG. 2 and Table 1.

TABLE 1

| | Weight average molecular weight (MW) |
|---|---|
| Standard heparin | 13,700 |
| Inventive substance | 11,100 |

3. Measurement of Neurite Outgrowth Promoting Activity, APTT and TT

Figure 3:
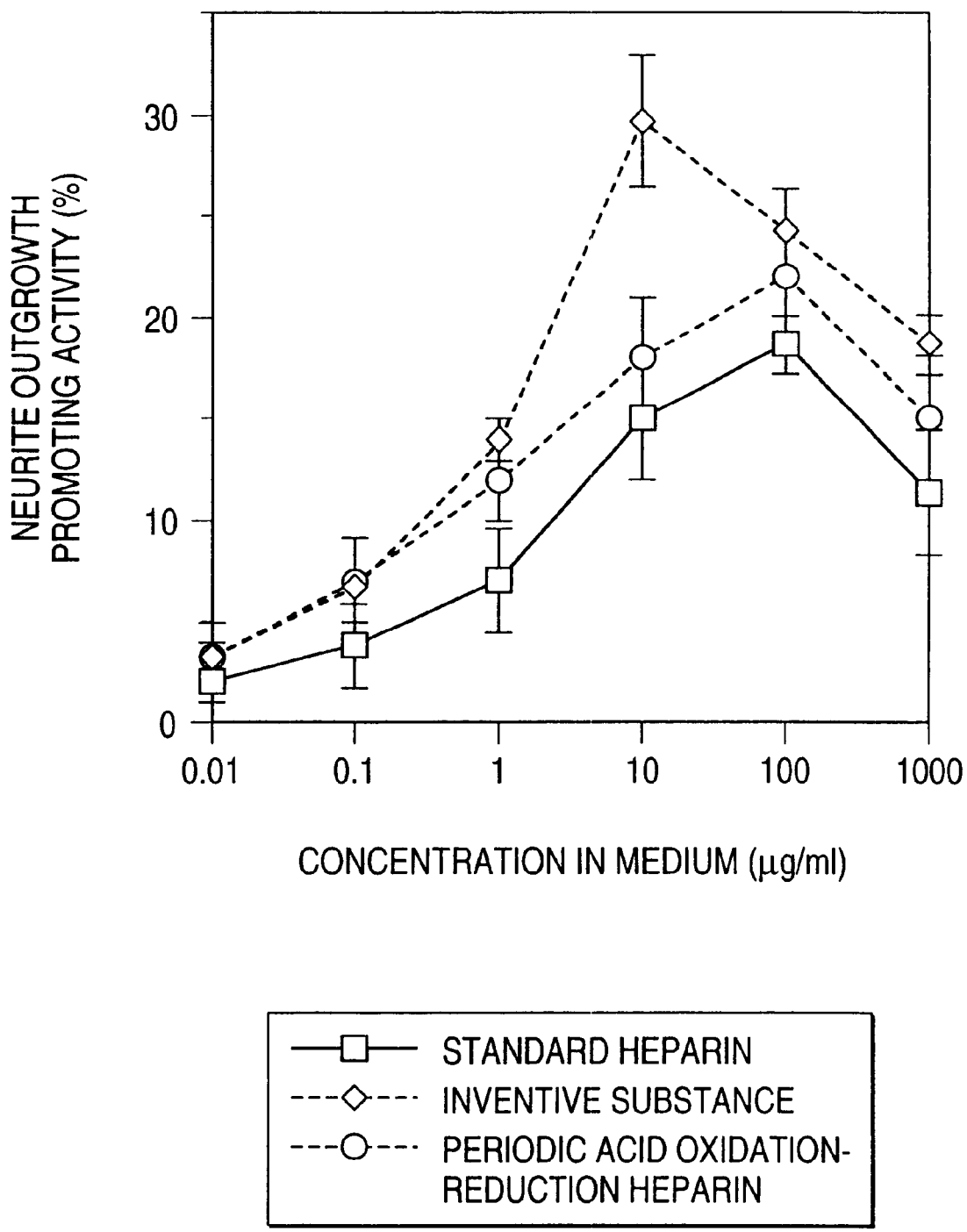
FIG. 3 is a graph showing changes in the neurite outgrowth promoting activity by the concentration of the standard heparin, the inventive substance and a periodic acid oxidation-reduction heparin in a medium. In the drawing, the neurite outgrowth promoting activity (%) is plotted as ordinate and the concentration in the medium (µg/ml) as abscissa.
Figure 4:
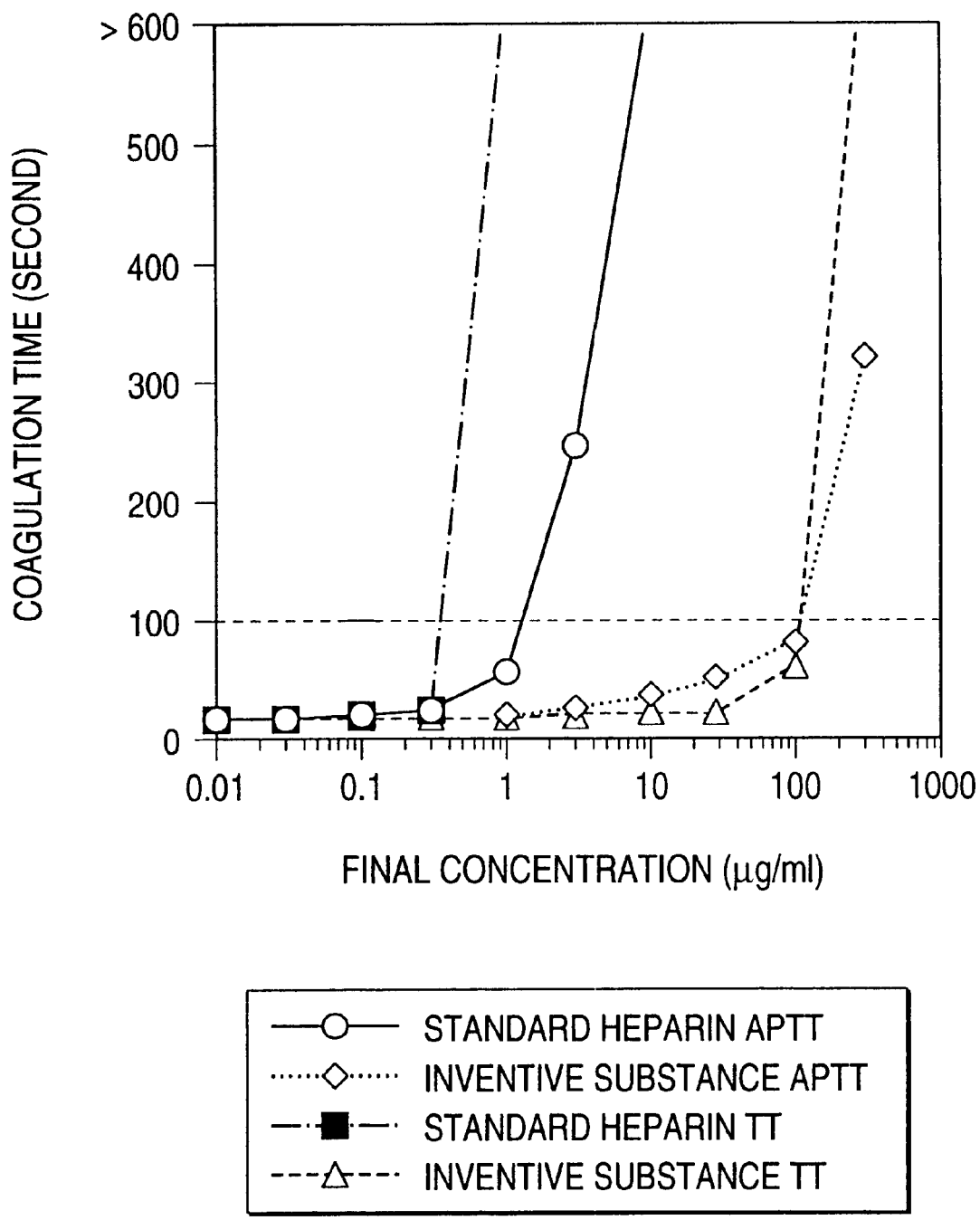
FIG. 4 is a graph showing changes in APTT and TT by varied concentrations of the standard heparin and the inventive substance. In the drawing, the coagulation time (second) is plotted as ordinate and the final concentration (µg/ml) as abscissa.

Neurite outgrowth promoting activity of each of the standard heparin shown in Table 1, the inventive substance obtained in step 2 and the periodic acid oxidation-reduction heparin obtained in step 1 was examined by Test Process 1, and the results are shown in FIG. 3. As a result, a sharp increase in the neurite outgrowth promoting activity was observed when 10 pg/ml of the inventive substance was added. APTT and TT of each of the standard heparin and the inventive substance were also examined by the processes described above, and the results are shown in FIG. 4. Also, APTT activity and TT activity were calculated by Test Process 4, and TT activity/APTT activity was calculated. In addition, APTT was measured by Test Process 4, by adjusting the final concentration of the standard heparin and the inventive substance to 3 µg/ml. Results of these measurements on the standard heparin and the inventive substance are shown in Table 2.

TABLE 2

| | Neurite outgrowth promoting activity | APTT (3 µg/ml) | APTT activity | TT activity | TT activity/ APTT activity |
|---|---|---|---|---|---|
| Standard heparin | 15.0 (10 µg/ml) | 248 sec | 100 | 100 | 1 |
| Inventive substance | 29.7 (10 µg/ml) | 32 sec | 2 | 0.37 | 0.185 |

It is known that a substance having lower TT activity than APTT activity shows low anticoagulation activity when administered as a medicament and therefore has high safety, and it was revealed that the inventive substance is such a substance.

Figure 5:
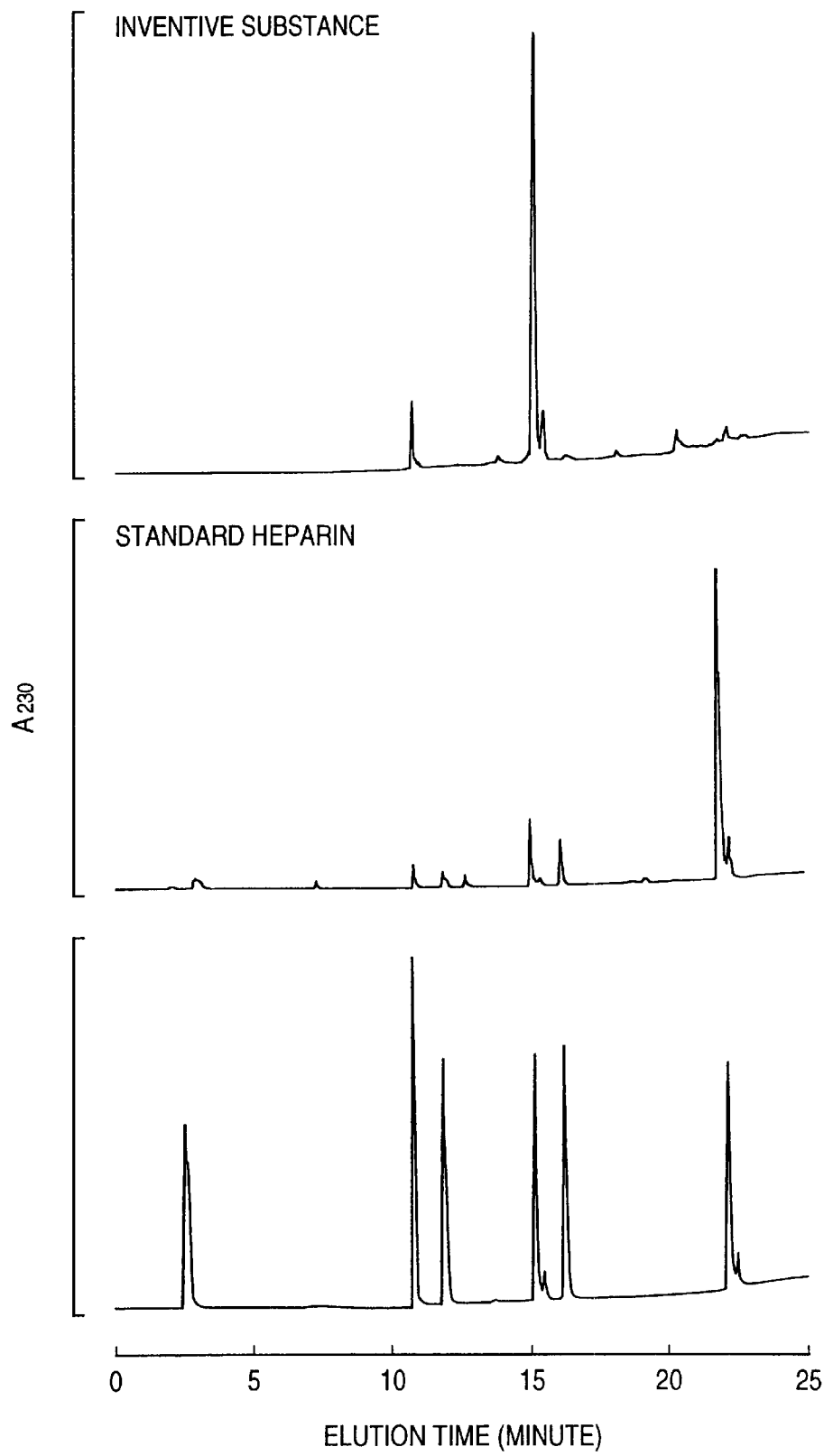
FIG. 5 is an HPLC elution chart graph by the disaccharide analysis of an unsaturated disaccharide standard sample (a), the standard heparin (b) and the inventive substance (c).

In addition, disaccharide analysis of the thus obtained inventive substance was carried out by Test Process 1, and the results are shown in FIG. 5. The disaccharide composition was calculated from the measured values, and the results are shown in Table 3.

TABLE 3

| | ΔDiHS- | | | | | | | |
|---|---|---|---|---|---|---|---|---|
| | OS | NS | 6S | US | (6,N)S | (U,N)S | (U,6)S | (U,6,N)S |
| Standard heparin | 4.1 | 3.4 | 3.7 | 2.6 | 12.7 | 7.6 | 1.7 | 64.2 |
| Inventive substance | 0.0 | 11.9 | 0.0 | 0.0 | 64.2 | 0.0 | 0.0 | 3.9 |

4. Measurement of Neural Cell Death Inhibition Activity

Cell death inhibition activity of the inventive substance on motor neural cells was measured.

Figure 6:
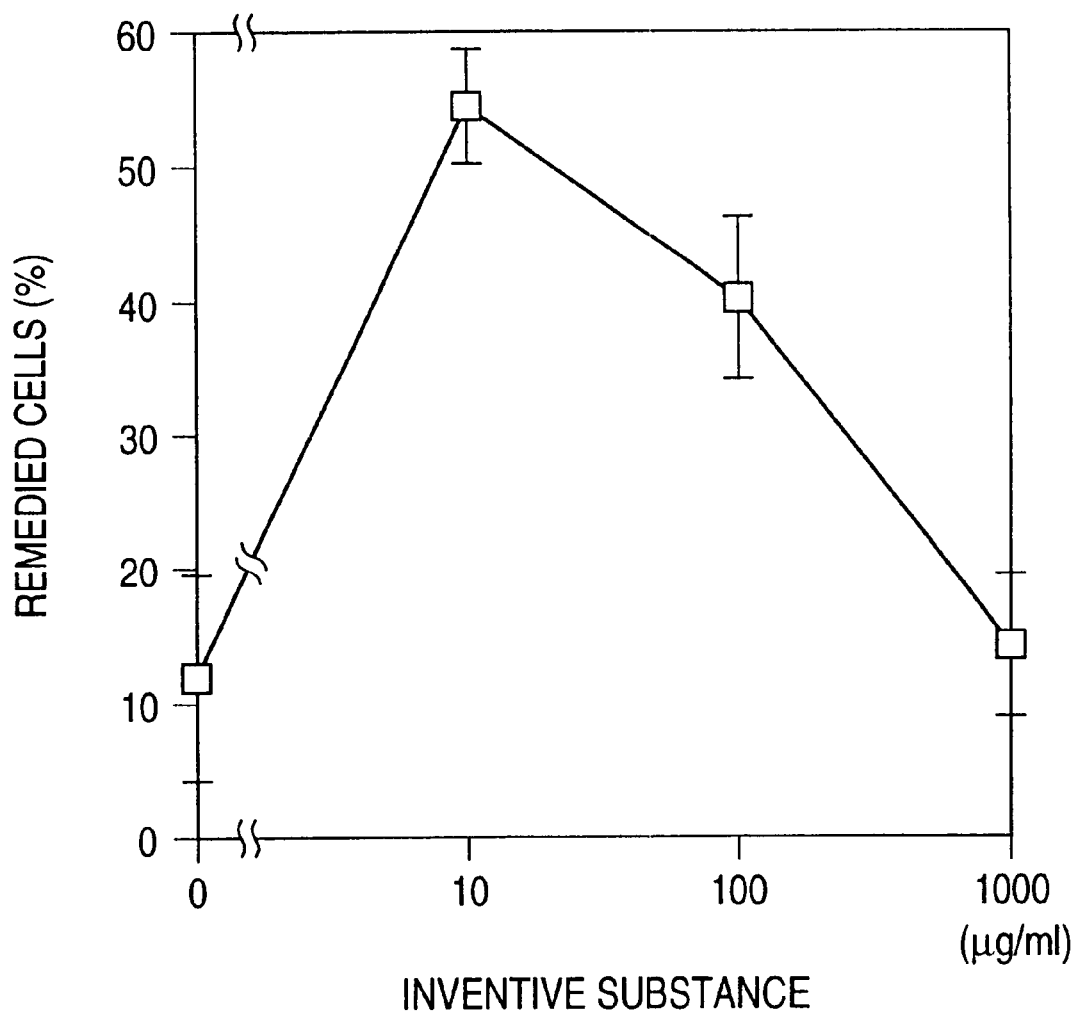
FIG. 6 shows influence of the inventive substance on neural cell death inhibition activity. In the drawing, the ratio of remedied cells (%) is plotted as ordinate and the final concentration (µg/ml) as abscissa.

That is, culturing was carried out by adding 0.09 ml of serum-free DMEM medium containing $1 \times 10^5$ of NSC-34 cells (received from Dr. Cashman (Toronto University): a mouse motor neuron-derived cultured cell strain) to a 96 well multi-plate which had been treated with 0.1% polyethylene imine in advance. Two hours after culturing, 10 µl of 100, 1,000 or 10,000 µg/ml aqueous solution of the inventive substance was added to respective wells (the final concentration in the medium is 10, 100 or 1,000 µg/ml). Thereafter, culturing was continued for 46 hours, and the number of survived cells was measured by the MTT process using a hemocytometer. By comparing with the number of survived cells after 2 hours of the culturing, the number of dead cells after 48 hours of the culturing of a control in which the inventive substance was not added was defined as 100%, and the ratio of difference from the number of dead cells when the inventive substance was added (the number of cells rescued from the cell death) was calculated as percentage (FIG. 6).

As a result, the activity to markedly inhibit cell death and thereby rescue the cells was observed in the systems in which 100 and 1,000 µg/ml of aqueous solution of the inventive substance were added. Since the number of cells which resulted in cell death when the 100 µg/ml aqueous solution was added was about half the number of the case of the standard heparin, it was revealed that about half the number of cells is rescued from cell death. In addition, neurite outgrowth promoting activity was observed in the survived cells similar to the case of central nerve-derived cells.

5. Measurement of Sialidase Inhibition Activity

The sialidase inhibition activity was measured on the standard heparin, the inventive substance and a known sialidase inhibitor NeuAc2en (2-deoxy-2,3-dehydro-N-acetylneuraminic acid).

5.1 Preparation of Substrate

Into a 15 ml capacity glass tube, 1 mg of GM2 ganglioside (manufactured by IATRON) was put, and dissolved by adding 0.8 ml of distilled water, followed by sonication. To the resulting solution, 0.1 ml of $PdCl_2$ solution (a supernatant fraction obtained by adding $PdCl_2$ to distilled water to a concentration of 25 mg/ml, followed by sonication for 30 minutes, and then centrifuging the mixture at 2,000×g) was added, followed by stirring. After the addition of 0.1 ml of 1 N NaOH and 40 µl of $NaB^3H_4$ (manufactured by NEN: 100 mCi/mmol, 1 M NaOH), followed by stirring, the atmosphere in the tube was replaced with nitrogen gas and then the mixture was stirred at room temperature for 24 hours, mixed with one scrape of $NaBH_4$ with a microspatula and again stirred at room temperature for 3 hours. Thereafter, the reaction was stopped by gradually adding about 0.6 ml of 1 M acetic acid, and the reaction solution was applied to a mini-column of AG50W-X8 (manufactured by Bio-Rad: 3 ml resin, swelled with methanol) and completely eluted with 10 ml of methanol. By drying the thus eluted substrate with nitrogen gas, the substrate [³H]GM2 was prepared.

5.2 Measurement of Sialidase Activity

Figure 7:
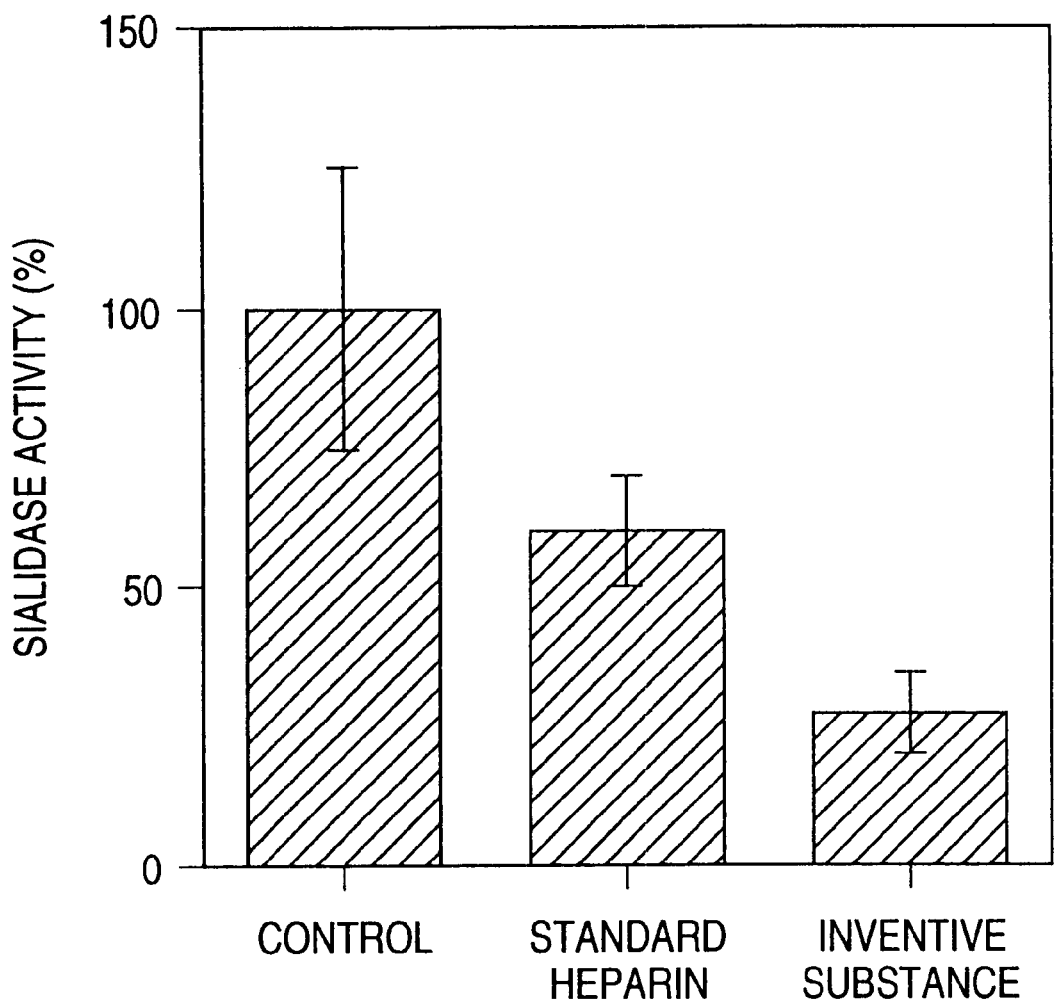
FIG. 7 shows influences of the standard heparin and the inventive substance on the sialidase activity. In the drawing, the sialidase activity (%) is plotted as ordinate.

The substrate [³H]GM2 (15 nmol) prepared in the step 4.1 was mixed with 1% Triton X-100 (10 μl), 0.1 M sodium acetate/acetic acid buffer (40 μl), a homogenate of NSC-34 cells (a sialidase-expressing motor neuron-derived cultured cell strain (10 μl, 100 μg protein), 10 μl of distilled water and 10 μl of an aqueous solution of the inventive substance or standard heparin (10 μg/ml), and the mixture was incubated at 37° C. for 1 hour. After the incubation, this was mixed with 5 ml of distilled water, applied to Sep-pak C18 cartridge column (manufactured by Waters) and eluted with methanol (3 ml) and then with chloroform : methanol (1:1 (v/v), 3 ml). The eluate was applied to DEAE-Sephadex A-25 column (manufactured by Pharmacia: 1 ml resin, swelled with methanol) and eluted with chloroform:methanol (1:1 (v/v), 3 ml), and then the eluate was dried to measure and compare radioactivity by a liquid scintillation counter. Radioactivity of a control in which 10 μl of distilled water was added instead of the standard heparin or inventive-substance was defined as 100% (FIG. 7).

As a result, it was revealed that the inventive substance has stronger activity to inhibit sialidase which degrades ganglioside than the standard heparin, thus indicating that it can be applied to diseases accompanied by increased sialidase activity and/or reduced ganglioside.

Figure 8:
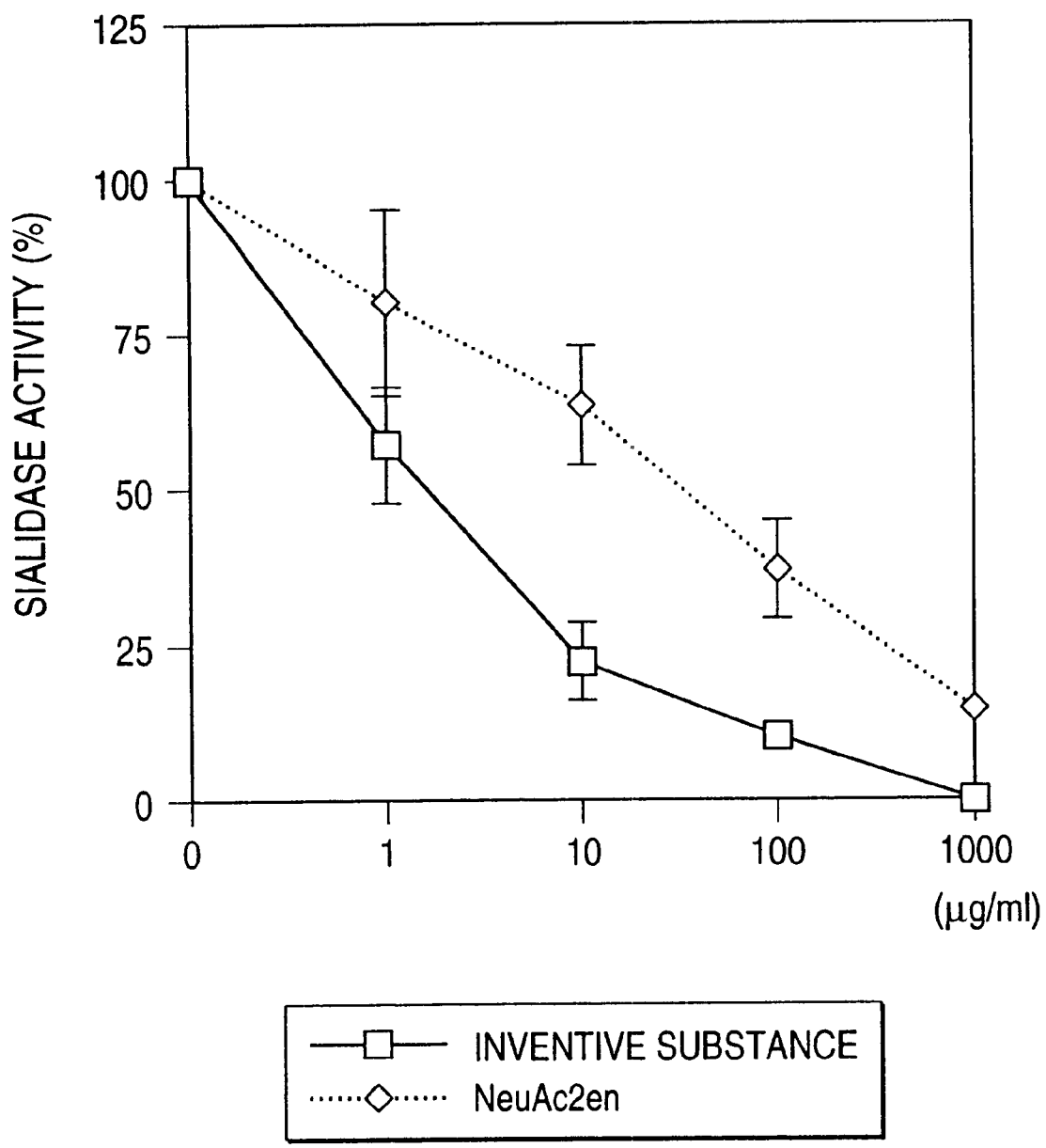
FIG. 8 shows influences of the inventive substance and NeuAc2en on the sialidase activity. In the drawing, the sialidase activity (%) is plotted as ordinate and the final concentration (µg/ml) as abscissa.

In addition, the sialidase activity was measured in the same manner as the above measuring process, using 10 μl of an aqueous solution of the inventive substance (10, 100 or 1,000 μg/ml) or NeuAc2en (10, 100 or 1,000 μg/ml), instead of 10 μl of 10 μg/ml aqueous solution of the inventive substance or standard heparin (FIG. 8).

As a result, it was revealed that the inventive substance has stronger sialidase inhibition activity than that of NeuAc2en.

EXAMPLE 2

Preparation Example (1) Injections

The inventive substance produced in Example 1 (30 mg/ml) was dissolved in 5% mannitol aqueous solution to a final concentration of 5 mg/ml, and the solution was subjected to aseptic filtration and then dispensed in 2 ml portions into ampoules to produce injections.

(2) Sprays

The inventive substance produced in Example 1 (30 mg/ml) was dissolved in PBS to a final concentration of 1 mg/ml, and the solution was subjected to aseptic filtration and then packed in 20 ml portions into sterilized spray containers to produce sprays.

(3) Tablets

A 100 mg portion of a freeze-dried preparation of the inventive substance was mixed with 670 mg of lactose, 150 mg of potato starch, 60 mg of crystalline cellulose and 50 mg of soft silicic anhydride, and a solution prepared by dissolving 30 mg of hydroxypropylcellulose in methanol (hydroxypropylcellulose 10% by weight) was added to the mixture and subjected to kneading granulation. Next, this was made into a granular form by extruding through a 0.8 mm mesh screen, dried, mixed with 15 mg of magnesium stearate and then subjected to compression molding to produce 200 mg tablets.

(4) Capsules 100 mg of a freeze-dried preparation of the inventive substance, 150 mg of potato starch, 50 mg of soft silicic anhydride, 10 mg of magnesium stearate and 765 mg of lactose were uniformly mixed, and the mixture was packed in 200 mg portions into hard capsules to produce capsules.

(5) Ointments 100 mg of a freeze-dried preparation of the inventive substance, 4 g of mineral oil, 8 g of petroleum jelly, 60 mg of mixed methyl/propylparaben, 1 g of a nonionic surface active agent and 30 g of purified water were uniformly mixed, and the mixture was packed into containers to produce ointments.

INDUSTRIAL APPLICABILITY

Since the novel glycosaminoglycan derivatives of the present invention have low anticoagulation activity and excellent neurite outgrow promoting activity, a pharmaceutical composition comprising this substance as an active ingredient and is useful for neurological disorders, for example, of the central nervous system, peripheral nerves, etc. can be provided. Also, since the novel glycosaminoglycan derivatives of the present invention have strong sialidase inhibition activity, an antiviral agent comprising this substance as an active ingredient can be provided.

What is claimed is:

1. A glycosaminoglycan derivative, or a salt thereof, having the following properties (a), (b) and (c) and comprising at least one structure represented by general formula (1) described in (d) per molecule of a backbone structure formed by a repeating unit structure of hexosamine and hexuronic acid:

(a) mol % of 2-deoxy-2-sulfamino-4-O-(4-deoxy-2-O-sulfo-α-L-threo-hex-4-enopyranosyluronic acid)-6-O-sulfo-D-glucose being from 0 to 10%, mol % of 2-deoxy-2-sulfamino-4-O-(4-deoxy-α-L-threo-hex-4-enopyranosyluronic acid)-6-O-sulfo-D-glucose being from 95 to 70%, and mol % of 2-deoxy-2-sulfamino-4-O-(4-deoxy-α-L-threo-hex-4-enopyranosyluronic acid)-D-glucose being from 5 to 20%, in a disaccharide composition obtained by a disaccharide analysis through a combination of degradation by a glycosaminoglycan degradation enzyme with analysis by high performance liquid chromatography, (b) activated partial thromboplastin time (APTT) when measured by adding to standard blood plasma at a final concentration of 3 μg/ml being 50 seconds or less, (c) weight average molecular weight being from 9,000 to 13,000 Da (dalton), and (d) general formula (1):

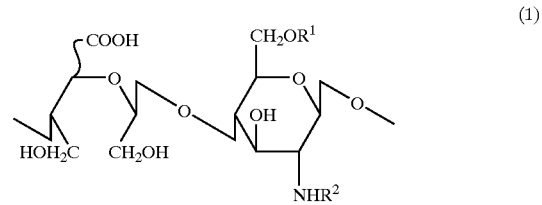

wherein $R^1$ represents H or $SO_3H$; and $R^2$ represents $COCH_3$ or $SO_3H$.

2. A glycosaminoglycan derivative having a structure of the following general formula (2), or a salt thereof, wherein activated partial thromboplastin time (APTT) when measured by adding it to a standard blood plasma at a final concentration of 3 μg/ml is 50 seconds or less:

wherein (A) represents a glucuronic acid residue represented by the following general formula (3), an iduronic acid residue represented by the following general formula (4), or a cleaved hexuronic acid residue represented by the following general formula (5):

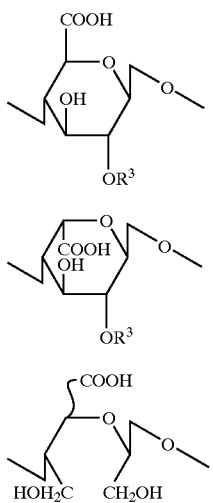

and (B) represents a hexosamine derivative residue represented by the following general formula (6):

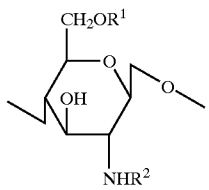

wherein, in general formulae (3) to (6), $R^1$ and $R^3$ each independently represents H or $SO_3H$, and $R^2$ is $COCH_3$ or $SO_3H$, and in general formula (2), n is an integer which satisfies $15 \leq n \leq 40$, and at least one of (A) is a residue of general formula (5).

3. The glycosaminoglycan derivative, or a salt thereof, according to claim 1, wherein the sulfated glycosaminoglycan having a repeating unit structure of hexosamine and hexuronic acid as the backbone structure is heparin.

4. A pharmaceutical composition comprising, as an active ingredient, the glycosaminoglycan derivative according to claim 1 or a pharmaceutically acceptable salt thereof.

5. A process for producing a glycosaminoglycan derivative, or a salt thereof, according to claim 1, having a repeating unit structure of hexosamine and hexuronic acid as a backbone structure in which a part of the hexuronic acid is cleaved between the 2-and 3-position carbon atoms, comprising the following steps (i) and (ii):

(i) a step in which a sulfated glycosaminoglycan having a repeating unit structure of hexosamine and hexuronic acid as a backbone structure is subjected to a cleavage treatment to cleave between only the 2- and 3-position carbon atoms of at least a part of hexuronic acid having no sulfate group on the 2-position in the backbone structure, and (ii) a step in which the product of the step (i) is subjected to a desulfation treatment by a desulfation method capable of specifically removing the 2-position sulfate group of hexuronic acid to desulfate 90% or more of sulfate groups of the total hexuronic acid having a sulfate group at the 2-position.

6. The process for producing a glycosaminoglycan derivative, or a salt thereof, according to claim 5, wherein the sulfated glycosaminoglycan having a repeating unit structure of hexosamine and hexuronic acid as the backbone structure is heparin.

7. The process for producing a glycosaminoglycan derivative, or a salt thereof, according to claim 5 or 6, wherein the cleavage treatment of step (i) comprises conducting an oxidative cleavage reaction using a periodate.

8. The process for producing a glycosaminoglycan derivative, or a salt thereof, according to claim 7, wherein the step (i) further comprising reducing the oxidative cleavage reaction product.

9. The process for producing a glycosaminoglycan derivative, or a salt thereof, according to claim 5, wherein the desulfation method of the 2-position sulfate group of hexuronic acid in the step (ii) is a hydrolysis reaction using an alkali metal hydroxide or an alkaline earth metal hydroxide.

* * * * *